(12) United States Patent
Martinson et al.

(10) Patent No.: US 8,659,986 B1
(45) Date of Patent: Feb. 25, 2014

(54) CROSSTALK CANCELLATION FOR A MULTIPORT ETHERNET SYSTEM

(75) Inventors: Jerry Martinson, Campbell, CA (US); Paul Langner, Fremont, CA (US); Hossein Sedarat, San Jose, CA (US)

(73) Assignee: Aquantia Corporation, Milpitas, CA (US)

( * ) Notice: Subject to any disclaimer, the term of this patent is extended or adjusted under 35 U.S.C. 154(b) by 169 days.

(21) Appl. No.: 13/190,419

(22) Filed: Jul. 25, 2011

(51) Int. Cl.
    *H04J 3/10* (2006.01)
(52) U.S. Cl.
    USPC ........... 370/201; 370/286; 370/288; 370/289; 370/290; 370/291
(58) Field of Classification Search
    USPC .................. 370/201, 286, 288, 289, 290, 291
    See application file for complete search history.

(56) References Cited

U.S. PATENT DOCUMENTS

| | | | | |
|---|---|---|---|---|
| 6,057,743 | A * | 5/2000 | Aekins ............................... | 333/1 |
| 6,201,796 | B1 * | 3/2001 | Agazzi et al. .................. | 370/286 |
| 6,208,671 | B1 * | 3/2001 | Paulos et al. .................. | 370/545 |
| 7,177,283 | B2 * | 2/2007 | Fukae et al. .................. | 370/252 |
| 7,236,463 | B2 * | 6/2007 | Lai ................................ | 370/286 |
| 7,720,075 | B2 * | 5/2010 | Costo ........................ | 370/395.53 |
| 7,881,322 | B1 * | 2/2011 | Benveniste .................... | 370/414 |
| 7,983,289 | B2 * | 7/2011 | Yamanaka et al. ............ | 370/428 |
| 8,271,807 | B2 * | 9/2012 | Jackson ........................ | 713/300 |
| 8,274,894 | B2 * | 9/2012 | Kneckt et al. .................. | 370/235 |
| 8,335,937 | B2 * | 12/2012 | Qi et al. ........................ | 713/320 |
| 2005/0042931 | A1 * | 2/2005 | Lavie ............................ | 439/676 |
| 2007/0064151 | A1 * | 3/2007 | Chang et al. .................. | 348/470 |
| 2007/0248024 | A1 * | 10/2007 | Conway et al. ................ | 370/252 |
| 2011/0286391 | A1 * | 11/2011 | Chen et al. .................... | 370/328 |
| 2011/0292977 | A1 * | 12/2011 | Farjadrad ...................... | 375/220 |
| 2012/0051240 | A1 * | 3/2012 | Dwivedi et al. ................ | 370/252 |
| 2012/0195227 | A1 * | 8/2012 | Vedantham et al. .......... | 370/253 |

FOREIGN PATENT DOCUMENTS

WO    WO 2011/056970 A2    5/2011

* cited by examiner

*Primary Examiner* — Hassan Kizou
*Assistant Examiner* — Abdullahi Ahmed
(74) *Attorney, Agent, or Firm* — Mahamedi Paradice Kreisman LLP

(57) ABSTRACT

A transceiver system is disclosed. The transceiver system comprises a first transceiver physical layer circuit (PHY) having a first plurality of channels and a second transceiver PHY disposed adjacent the first transceiver PHY and having a second plurality of channels. Filter circuitry is coupled between at least one of the plurality of first channels and at least one of the plurality of second channels.

15 Claims, 6 Drawing Sheets

CROSSTALK CANCELLATION FOR A MULTIPORT ETHERNET SYSTEM

TECHNICAL FIELD

The disclosure herein relates to electronic communications, and more particularly to mitigating interference in signals transmitted over communication channels.

BACKGROUND

Communication systems are widely used in computer and device networks to communicate information between computers and other electronic devices. Transceivers of a communication system send and receive data over a link (including one or more channels) of a communication network to communicate with other transceivers. A transceiver includes a transmitter for sending information across a link, and a receiver for receiving information from a link. The receiver detects transmitted data on the link and converts the data into a form usable by the system connected to the transceiver. For example, one widely-used network communication standard is Ethernet, including several different standards for different network bandwidths, including 10GBASE-T allowing 10 gigabit/second connections over unshielded or shielded twisted pair cables.

There are multiple sources of impairment and interference in a 10GBASE-T system which can cause significant performance degradation. These sources of impairment and interference can be broadly categorized as internal and external sources. The internal sources are often caused by the link-partners themselves and imperfect channel characteristics. Examples of these sources are inter-symbol interference (ISI), echo and pair-to-pair cross-talk such as far-end crosstalk (FEXT) and near-end crosstalk (NEXT). Such noise sources are typically known to the link partners and thus can often be cancelled effectively with cancellers and equalizers.

Another type of impairment in 10GBASE-T systems is interference from sources external to a particular link. Examples of external interfering sources, referred to herein as alien interferers, include adjacent cross-talking Ethernet ports/links, where the noise source is from a different port or cable that is adjacent to the subject link (port). In such circumstances, the source of the interference is unknown to the subject link, and is a greater challenge to reduce than noise originating from a known source such as ISI, echo, FEXT, and NEXT.

Accordingly, what is needed are systems and methods that reduce or cancel alien interference in channels of communication systems, providing more robust communication in such systems.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of a transceiver system are disclosed. The transceiver system comprises a first transceiver physical layer circuit (PHY) having a first plurality of channels and a second transceiver PHY disposed adjacent the first transceiver PHY and having a second plurality of channels. Filter circuitry is coupled between at least one of the plurality of first channels and at least one of the plurality of second channels. The filter circuitry enables the first and second PHYs to share information in a manner that allows for a cancellation of crosstalk occurring between the PHYs.

In a further embodiment, a multi-port ethernet connection system is disclosed. The system includes a multi-port connector module including a pair of adjacent ports, each port for coupling to a plurality of differential channels. A transceiver system is coupled to the multi-port connector module. The transceiver system includes a first transceiver physical layer circuit (PHY) having a first plurality of channels and a second transceiver PHY disposed adjacent the first transceiver PHY and having a second plurality of channels. Filter circuitry is coupled between at least one of the plurality of first channels and at least one of the plurality of second channels.

In yet another embodiment, a method of cancelling crosstalk between adjacent ports of a multi-port ethernet connector is disclosed. The method includes coupling a first channel from a first transceiver PHY corresponding to a first connector port to a second channel from a second transceiver PHY corresponding to a second connector port; and adaptively filtering the second channel to compensate for the coupling of the first channel.

Figure 1:
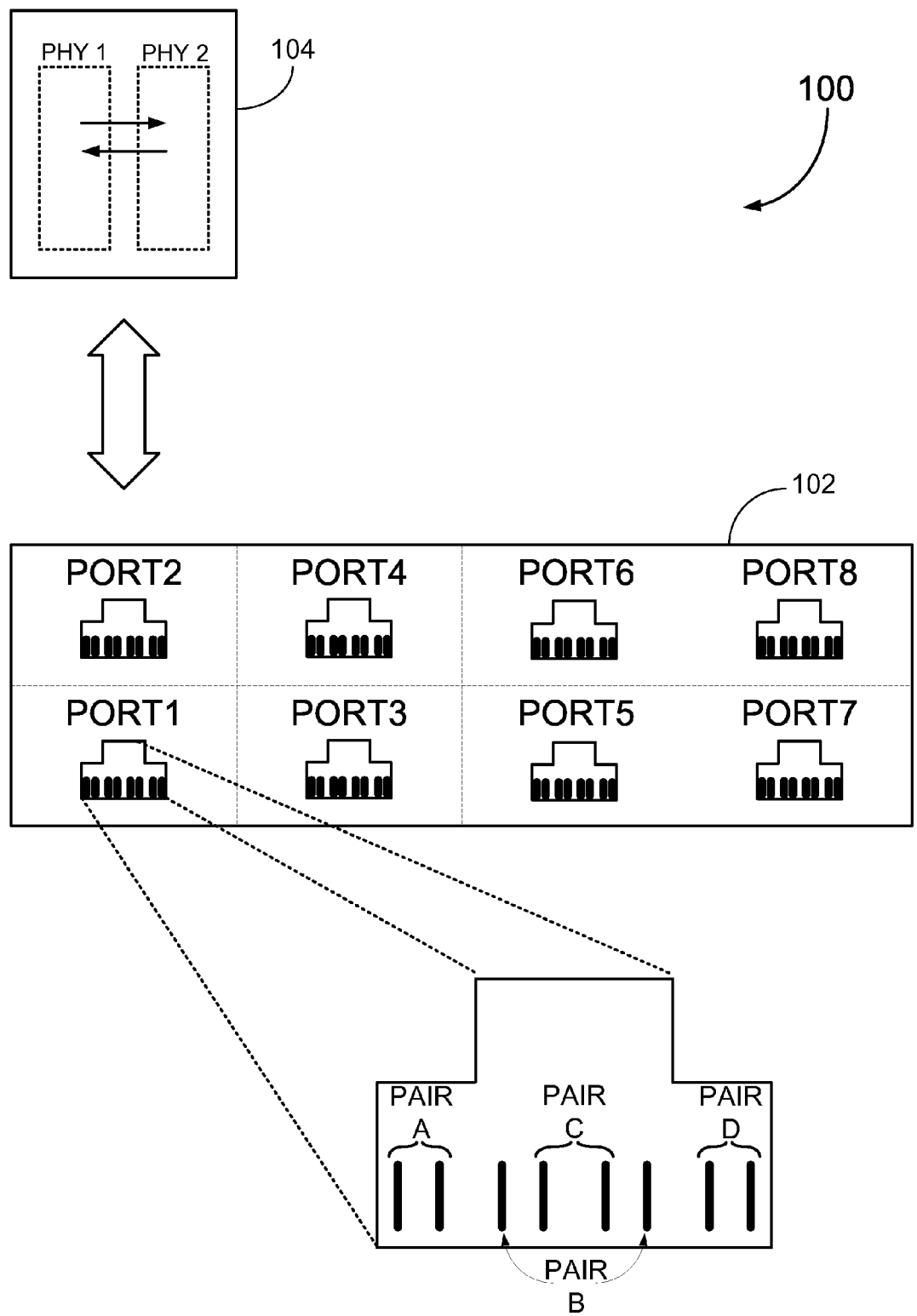
FIG. 1 illustrates one embodiment of a multiport ethernet connector system.

FIG. 1 is a block diagram illustrating one embodiment of a multiport ethernet connector system, generally designated 100. The connector system employs a connector module 102, often referred to as a "stack jack" that provides a plurality of ports PORT 1-PORT 8 corresponding to separate ethernet channels. Generally speaking, the connector module often takes the form of a 2XN array of RJ45 jacks, where "N" represents the number of jacks in a given row. While a 2XN module is illustrated in FIG. 1, other variations such as single row (1XN) or quad row (4XN) may also be used. Additionally, while RJ45 jacks are often utilized, other similar receptacles may be employed.

One example of an RJ45 jack configuration is shown in the magnified closeup of connector PORT 1. The pinout corresponds to legacy wiring associated with the Plain Old Telephone Service (POTS) network, and includes four pairs of differential contacts PAIR A, PAIR B, PAIR C and PAIR D for coupling to respective differential paths (not shown). As seen in FIG. 1, contact pairs PAIR A, PAIR C and PAIR D include contacts that are adjacent, and thus exhibit a high degree of differential noise rejection. However, contact PAIR B includes contacts that straddle the PAIR C contacts. As a result, a significant amount of interference emanates from PAIR B. The noise issue is especially acute between PAIR B interfaces in adjacent ports, such as between PORT 1 and PORT 2.

Further referring to FIG. 1, adjacent connector ports PORT 1 and PORT 2 are coupled to adjacent transceiver physical layer circuits PHY 1 and PHY 2. For example, PHY 1 forms the transceiver circuitry for signals propagating through PORT 1, while PHY 2 forms the transceiver circuitry for signals routed through PORT 2. In one embodiment, both PHY 1 and PHY 2 are formed on a common integrated circuit chip 104 and disposed adjacent one another. This proximity lends itself well to enabling a sharing of information between the PHYs, and thus enable the cancelling of PAIR B interference as more fully described below.

Figure 2:
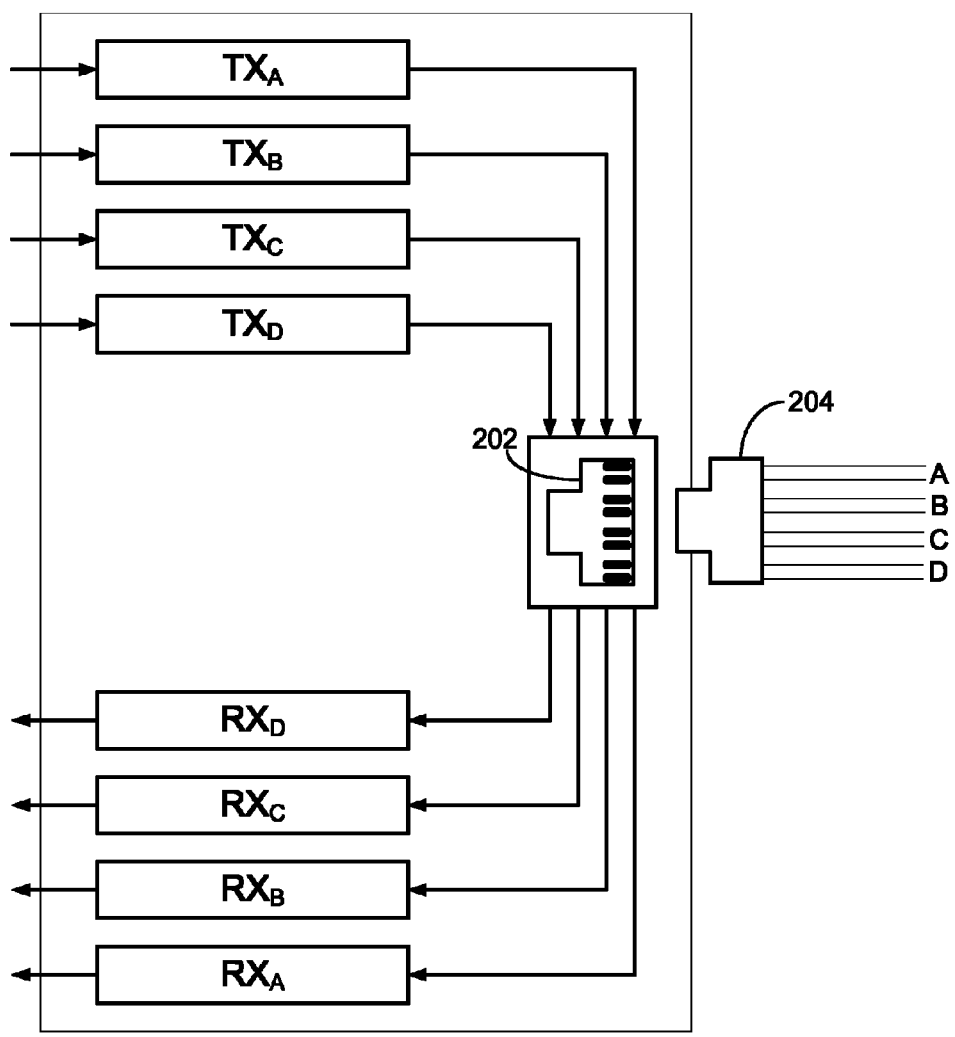
FIG. 2 illustrates one embodiment of a multi-channel transceiver architecture for one port of the connector system of FIG. 1.

FIG. 2 illustrates a high-level organization of each PHY in accordance with the 10GBASE-T standard. A connector receptacle 202 is configured to receive four pairs A-D of twisted pair wires via an RJ11 plug 204. A plurality of transmitters $TX_A$-$TX_T$ and receivers $RX_A$-$RX_D$ are connected to one or more components (not shown) of a computer system, device, processor, or other "controller" associated with each respective transceiver which want to communicate data over the communication network. A transmitter circuit TX and a receiver circuit RX (together forming a transceiver circuit) couple to each differential pair. For example, transmitters $TX_{A-D}$ receive data and control signals from the controller in order to send the data over the network to other transceivers and controllers, while receivers $RX_{A-D}$ receive data from other transceivers and controllers via the network in order to provide the data to the controller.

Figure 3:
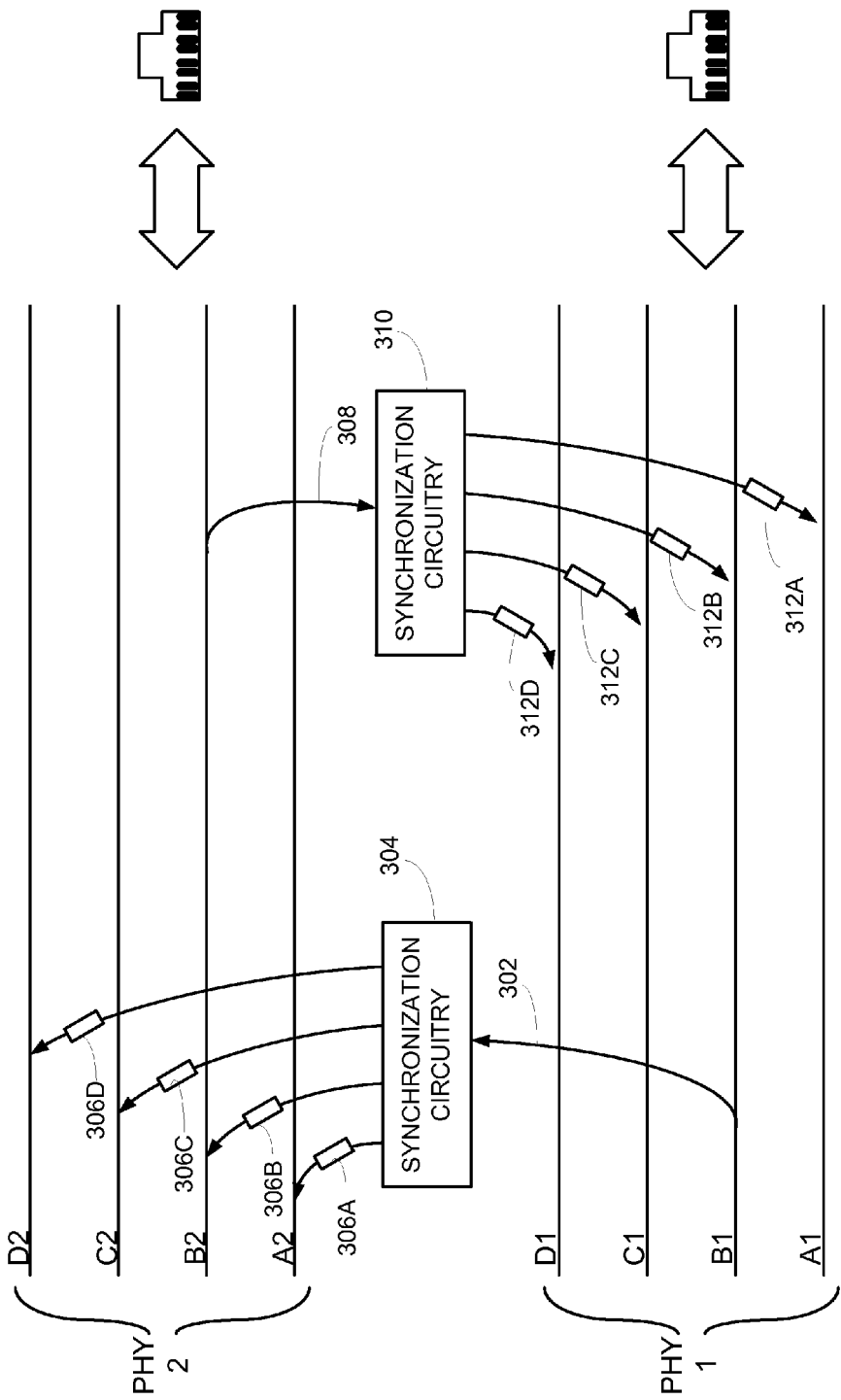
FIG. 3 illustrates one embodiment of an apparatus to provide shared information between selected channels in adjacent PHYs.

FIG. 3 is a schematic diagram illustrating one embodiment of an adaptive canceling circuit 300 for canceling alien interference resulting from adjacent ethernet channels. Herein, the term "cancel" for alien interference is intended to include cancellation of at least part of the total alien interference present, i.e. reduction of the total alien interference, or can include complete cancellation of all substantial alien interference. In one embodiment, the circuit involves a cross-coupling of respective transceiver channels PAIR B1 and PAIR B2 from adjacent PHY circuits PHY1 and PHY2. In this manner, noise coupling caused by the radiating PAIR B channels may be shared and canceled.

The adaptive canceling circuit 300 includes a first path, such as a bus 302 that couples to PAIR B1 and routes data from PAIR B1 to a synchronization circuit 304. The synchronization circuit re-synchronizes the data from the timing domain of PHY 1 to the timing domain of PHY 2. One specific embodiment of a synchronization circuit is described below, but any form of time domain crossing circuitry may be employed. The output of the synchronization circuitry is distributed to a plurality of adaptive filters 306A-306D, which filter the PAIR B1 information and feed it to respective crosstalk summing nodes associated with each transceiver channel PAIR A2-D2, as more fully explained below. While a plurality of adaptive filters are shown corresponding to each transceiver channel, at a minimum, one filter may be used, such as to PAIR B2, since the PAIR B couplings form a majority of the detectable interference.

Further referring to FIG. 3, the adaptive cancelling circuit employs a second bus 308 coupled to PAIR B2 to route data from PAIR B2 to a second synchronization circuit 310 capable of carrying out a time domain crossing for the PAIR B2 data and clock from the PHY2 domain to the PHY1 domain. The re-synchronized PAIR B2 data is then fed to an array of adaptive filters 312A-D that are correspondingly coupled to each of the PHY 1 transceiver channels PAIR A1-D1.

Each adaptive filter 306A-D and 312A-D can provide a cancellation of the interference from the source PAIR B1 or PAIR B2 similarly to cross-talk cancellation, such as Near End Crosstalk (NEXT) cancellation. For example, finite impulse response (FIR) filters can be included in the filters to perform the alien interference cancellation. In some embodiments, the interference cancellation using FIR filters can be performed fully in the digital domain, where the calculated digital value of interference by each adaptive filter may be subtracted at a corresponding adder from a corresponding noisy data input on a corresponding channel PAIR A-D (which can be previously digitized by an analog to digital converter (ADC), for example) to provide a resulting signal having the interference cancelled.

Figure 4:
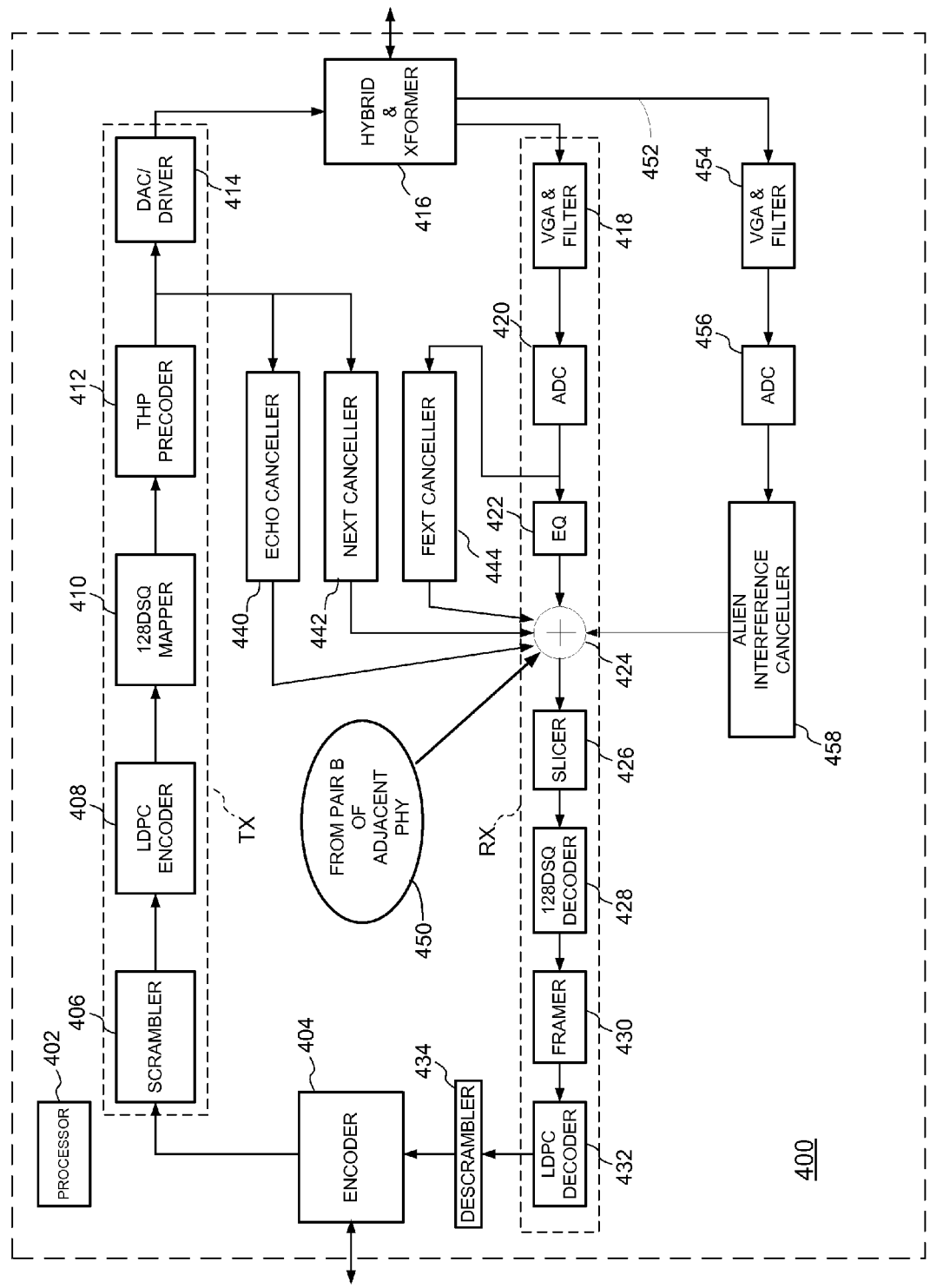
FIG. 4 illustrates one embodiment of a transceiver circuit employing a filter input for receiving information from an adjacent PHY.

FIG. 4 is a block diagram illustrating one example of a transceiver channel, generally designated 400, suitable for use with an embodiment. This example is suitable for a 10GBASE-T standard, but other different configurations and types of transceiver components can be used in other embodiments for 10GBASE-T or for other, different communication standards. For explanatory purposes, the example shown in FIG. 4 illustrates a single transmitter path TX per channel and a single receiver path RX per channel for data. Multiple such paths or channels are provided in embodiments having multiple channels, e.g. four of the transmitter paths and the receiver data paths shown in FIG. 4 are used in the 10GBASE-T standard, one path for each channel.

One or more processors 402 are typically included in transceiver 400, or connected to the transceiver to control various operations for transceiver components described below. In the transmitter path TX, an encoder 404 can be used to encode data desired to be transmitted in a particular desired format or standard, followed by a scrambler 406 for self-synchronized scrambling of the data to be transmitted, providing clock transitions, a statistically random power spectrum for EMI (electromagnetic interference) control, equalizer convergence, etc. A low density parity check (LDPC) encoder 408 encodes the data according to the parity check for error correction. A 128DSQ mapper 410 (or other type of mapper) then can use a coset-partitioned constellation to map the data to symbols, and each 128-DSQ symbol is transmitted using two back-to-back PAM-16 signals (Pulse Amplitude Modulation, 16 levels). A Tomlinson-Harashima Precoding (THP) precoder 412 can then adjust the signal to assist the far-end receiver in performing signal equalization. An analog front end (AFE) for the transmitter can include a digital-to-analog converter (DAC) and driver block 414 which converts the data to analog form for transmission and transmits the data via the hybrid coupler and transformer block 416 to the channel output port.

In a receiver portion of the transceiver 400, data is received at the hybrid coupler and transformer block 416. Four data communication channels are used in a 10GBASE-T embodiment (other amounts of channels can be used in other embodiments), and are sent to an analog front end (AFE) for the receiver which can include a variable gain amplifier (VGA) and filter 418 for filtering, and an analog-to-digital converter (A/D) 420. An equalizer block 422 can include one or more equalizers to remove inter-symbol interference (ISI). The output of the equalizer block 422 is summed with the outputs of a plurality of filters 440, 442 and 444 (described below) at adder 424, and the output of the adder can be provided to a slicer 426 which can provide an average noise level in the received signal. The signal can then be provided to a DSQ128 decoder 428, which outputs decoded data to a framer 430 that extracts frames from the received data and provides the frames to an LDPC decoder 432 which error-corrects the data. The data can then be provided to a descrambler 434 which outputs de-scrambled data to the encoder 404 for provision to a connected computer system, processor, or other device.

The filters 440, 442 and 444 are used to reduce echo and crosstalk (NEXT and FEXT) noise which may be introduced in the transmission and reception of data over one or more of the four communication channels. The filters cancel out the effect of signal echo and crosstalk from adjacent lines to achieve an acceptable bit error rate. The output of the THP precoder 412 in the transmitter portion TX is provided to the Echo canceller 440 and the NEXT canceller 442, which calculate the values for cancellation of echo and NEXT and output these values to the adder 424. Similarly, the output of ADC 420 is provided to the FEXT canceller 444, which calculates the values for cancellation of FEXT and outputs the values to the adder 424. The digital values of echo and crosstalk calculated by the filter are subtracted from the incoming noisy analog data (digitized by ADC 420) by adder 424 to provide received data on each channel with reduced noise.

The described embodiment also includes an additional filter input at 450, to receive a filtered output (such as from one of 306A-D or 312A-D from FIG. 3) associated with a PAIR B channel from an adjacent PHY circuit. By including the additional filter input, information between different PHYs may be shared to enable for adaptive filtering and cancellation of crosstalk resulting from at least noisy PAIR B couplings.

In a further embodiment, an interference or common-mode path is used for common mode noise detection, to allow for further cancellation of alien interference. This path starts as a line 452 connected to the hybrid and transformer block 416 that provides a common mode signal. For example, the common mode signal can be obtained in a manner consistent with those described in copending U.S. patent application Ser. No. 12/551,396, titled "Cancellation of Alien Interference in Communication Systems", filed Aug. 31, 2009, assigned to the assignee of the present disclosure and hereby incorporated by reference in its entirety.

After being output from the hybrid and transformer block 416, the common mode signal on line 452 can be provided to an analog front end (AFE) that is dedicated to the common mode path, including a variable gain amplifier (VGA) and filter 454, and an analog to digital converter (ADC) 456. The output of the ADC 456 is provided to an alien interference canceller block 458, and fed to summing node 424.

The transceiver circuit exhibits certain signaling parameters that initially undergo a standard training sequence to achieve fully-functional nominal operation of data communication over a signaling link. The training sequence also establishes an initial clock synchronization that establishes a phase-locked condition between link partners. The nominal operation is a predefined level of operation at which parameters are at a particular target level (such as bit error rate being under a particular target rate), and for which the transceiver can transmit and receive data over the link. The full training sequence is a predefined sequence of stages or steps known by the link partners, although the boundaries of the stages can be overlapped or blurred in some embodiments. The sequence typically occurs at a predefined point of operation, such as at startup when a transceiver is powered on or is first connected to a communication link. During nominal operation, after the full training sequence, the transceiver continues to adapt parameters (i.e. a continuous adaptation) to changing characteristics of the link based on received data. In one embodiment, more fully described in copending U.S. application Ser. No. 12/551,347, filed Aug. 31, 2009, entitled Fast Retraining For Transceivers In Communication Systems, and assigned to the assignee of the present invention, the training sequence may be shortened to reduce training time.

Figure 5:
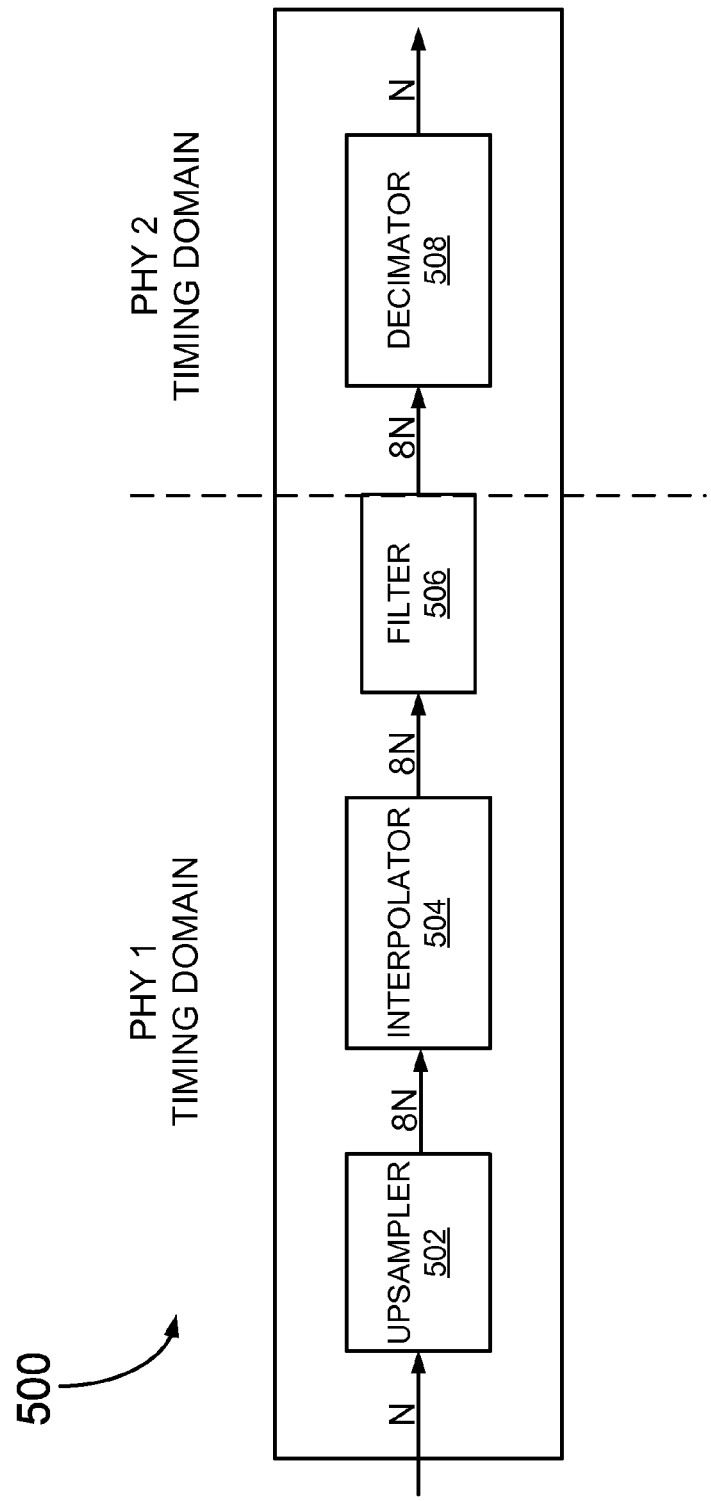
FIG. 5 is a block diagram illustrating one embodiment of a synchronization circuit for the apparatus of FIG. 3.

FIG. 5 illustrates one embodiment of a time domain crossing circuit, generally designated 500, for use with the synchronization circuitry 304 and 310 in an effort to share the PAIR B information between adjacent PHY circuits, yet maintain a phase-locked condition between respective link partners. The circuit includes an upsampler 502 that receives data (and embedded timing information) from a PAIR B transceiver channel at a first clock rate N in a first timing domain associated with a given PHY. The upsampler oversamples the information by a given factor, such as by 8 (in one embodiment) and generates samples at the upsampling rate. An interpolator 504 then receives the samples and interpolates between the sampling points. A low-pass filter 506 receives the interpolated signals and feeds a filtered result to a decimator 508. At this point, the filtered output is received as an input to the decimator in a second timing domain associated with a second PHY. The decimator tosses samples at a decimation rate to re-synchronize the PAIR B information in the clock domain of the target PHY.

Figure 6:
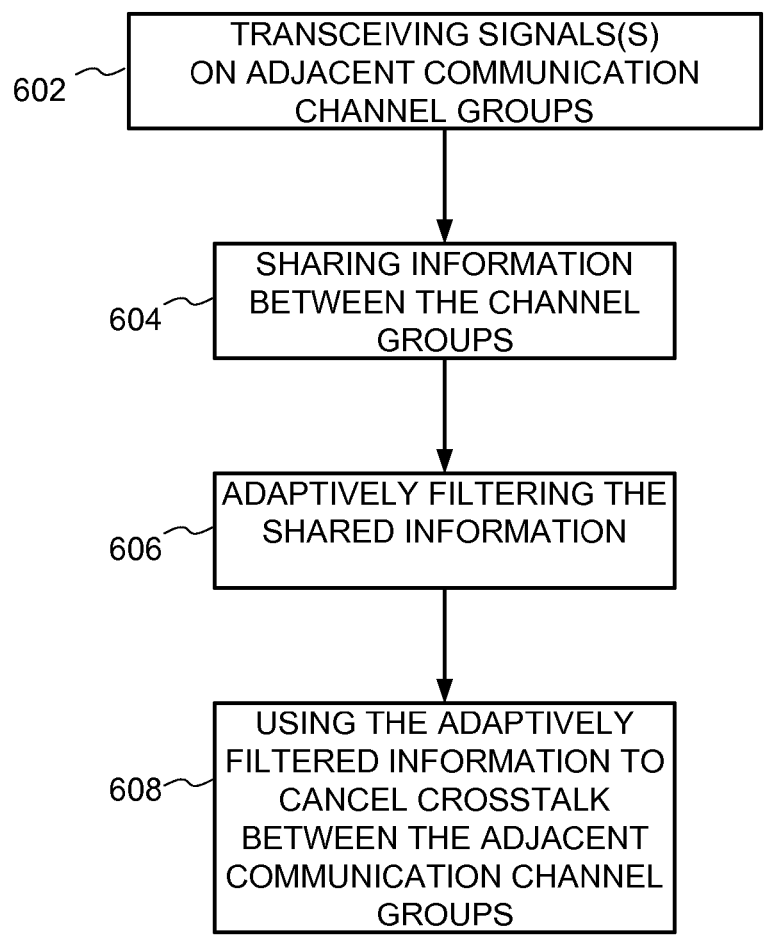
FIG. 6 is a flow diagram illustrating a method of providing crosstalk cancellation between selected channels on adjacent PHYs.

FIG. 6 is a flow diagram illustrating one embodiment of a method, generally designated 600, that is consistent with the systems and circuitry described herein. The method includes transceiving signals on adjacent communication channels, at step 602, such as ethernet channels, and sharing information between the channel groups, at step 604. As described more fully above, the information is associated with noisy PAIR B transceiver channels from different transceiver PHY circuits. The information is adaptively filtered, at step 606, in a continuous fashion, and used to cancel crosstalk between the adjacent communication channel groups, at step 608.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A transceiver system comprising:
    a first transceiver circuit for communicating first data with a first link partner transceiver circuit via a first plurality of channels that are associated with a first timing domain;
    a second transceiver circuit disposed adjacent the first transceiver circuit, the second transceiver circuit for communicating second data with a second link partner transceiver circuit via a second plurality of channels associated with a second timing domain, the second data being independent from the first data;
    filter circuitry coupled between at least one of the plurality of first channels and at least one of the plurality of second channels; and
    synchronization circuitry coupled to the filter circuitry to synchronize information from the first timing domain to the second timing domain.

2. The transceiver system according to claim 1 wherein:
    the first plurality of channels are for coupling to corresponding differential pairs of conductors in a connector.

3. The transceiver system according to claim 2 wherein at least one of the differential pairs of conductors in the connector comprises non-adjacent conductors.

4. The transceiver system according to claim 3 wherein the filter circuitry is coupled between a first channel including non-adjacent conductors and a second channel having non-adjacent conductors.

5. The transceiver system according to claim 1 wherein the synchronization circuitry comprises:
    an upsampler to receive information from the first transceiver circuit and generate samples at an upsampling rate;
    an interpolator to interpolate the samples;
    a low-pass filter to filter the interpolated samples; and
    a decimator to selectively remove samples from the interpolated samples at a decimation rate.

6. The transceiver system according to claim 1 wherein the first and second transceiver circuits transceive signals in accordance with a 10GBASE ethernet protocol.

7. The transceiver system according to claim 1 wherein each transceiver circuit includes four transceiver channels.

8. The transceiver system according to claim 1 wherein the first and second transceiver circuits are embodied on a common 10GBASE-T ethernet transceiver integrated circuit chip.

9. A multi-port ethernet connection system comprising:
    a multi-port connector module including a pair of adjacent ports, each port for coupling to a plurality of differential channels; and
    a transceiver system coupled to the multi-port connector module, the transceiver system comprising
        a first transceiver circuit for communicating first data with a first link partner transceiver circuit via a first plurality of channels that are associated with a first timing domain;
        a second transceiver circuit disposed adjacent the first transceiver circuit, the second transceiver circuit for communicating second data with a second link partner transceiver circuit via a second plurality of channels that are associated with a second timing domain, the second data being independent from the first data;
        filter circuitry coupled between at least one of the plurality of first channels and at least one of the plurality of second channels; and
        synchronization circuitry coupled to the filter circuitry to synchronize information from the first timing domain to the second timing domain.

10. The multi-port ethernet connection system of claim 9 wherein the multi-port connector module comprises a plurality of RJ45 ethernet jacks.

11. The multi-port ethernet connection system of claim 9 wherein the first and second transceiver circuits are disposed on a common integrated circuit and are coupled to the pair of adjacent ports.

12. The multi-port ethernet connection system of claim 10 wherein each of the RJ45 ethernet jacks includes non-adjacent contacts defining a Pair B interface to engage a corresponding differential pair of conductors.

13. The multi-port ethernet connection system of claim 12 wherein the filter circuitry couples between a first Pair B interface on the first transceiver circuit and a second Pair B interface on the second transceiver circuit.

14. A method of cancelling cross-talk between adjacent ports of a multi-port ethernet connector, the method comprising:
    coupling a first channel in a first timing domain from a first transceiver circuit corresponding to a first connector port to a second channel in a second timing domain from a second transceiver circuit corresponding to a second connector port, the coupling including sharing information associated with the first channel with the second channel;
    adaptively filtering the second channel to compensate for the coupling of the first channel; and
    synchronizing the information from the first timing domain to the second timing domain.

15. The method according to claim 14 wherein the synchronizing comprises:
    upsampling the information in the first timing domain to generate samples at an upsampling rate;
    interpolating the samples;
    filtering the interpolated samples; and decimating the filtered samples in the second timing domain.

* * * * *